United States Patent
Palu

[11] 3,881,214
[45] May 6, 1975

[54] WINDSHIELD WIPER BLADE MADE OF SYNTHETIC MATERIAL, WITH THE SUPPORTING STRUCTURE FORMED AS AN INTEGRAL ELEMENT

[75] Inventor: Attilio Dal Palu, Almese, Italy

[73] Assignee: Fister S.n.c. di Bosso Giacomo & C., Torino, Italy

[22] Filed: Aug. 31, 1973

[21] Appl. No.: 393,687

[30] Foreign Application Priority Data
Sept. 9, 1972 Italy .................................. 69870/72
May 7, 1973 Italy .................................. 68264/73

[52] U.S. Cl. ............................................ 15/250.42
[51] Int. Cl. ............................ B60s 1/04; B60s 1/38
[58] Field of Search ....... 15/250.32, 250.33, 250.34, 15/250.35, 250.42

[56] References Cited
UNITED STATES PATENTS
2,760,220  8/1956  Deibel .............................. 15/250.42
3,178,753  4/1965  Wise ................................. 15/250.42
3,427,637  2/1969  Quinlan et al. ................... 15/250.42
3,757,377  9/1973  Hayhurst ........................... 15/250.32

*Primary Examiner*—Peter Feldman
*Attorney, Agent, or Firm*—Ladas, Parry, Von Gehr, Goldsmith & Deschamps

[57] ABSTRACT

A windshield wiper blade made of a thermoplastic material and having the supporting structure formed as an integral element is described. The main feature of this windshield wiper blade is that of having the supporting structure provided with inner reliefs which enable the windshield wiper blade to be conveniently deformed during the use. Along the supporting structure there is also arranged a metal element, resiliently deformable, so that in its rest position, and even at high temperature values, the windshield wiper blade is caused to assume always the same configuration.

8 Claims, 6 Drawing Figures

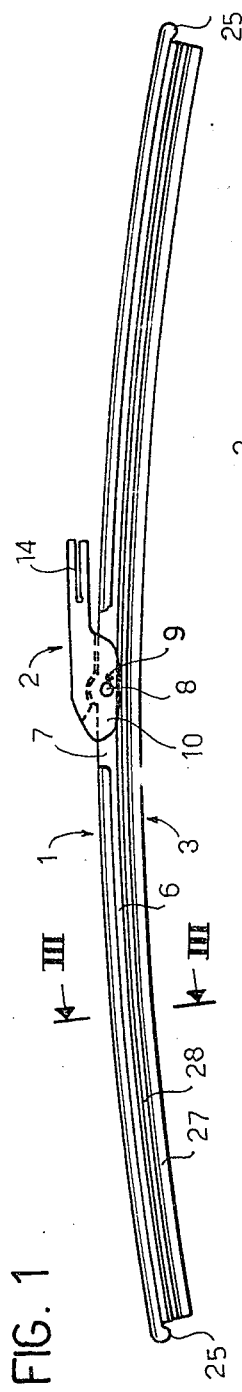
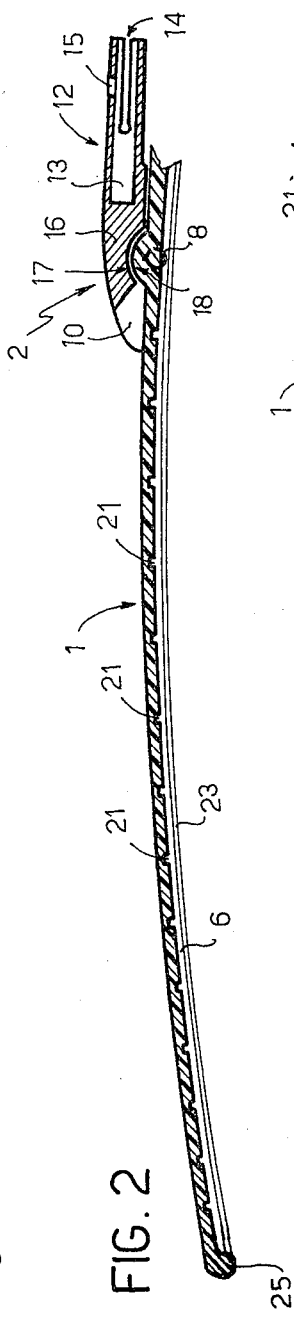
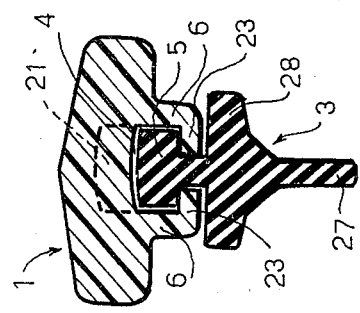
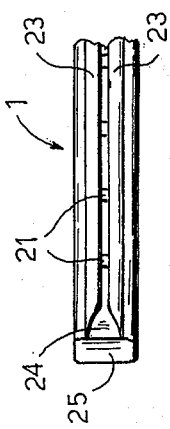
FIG. 1
FIG. 2
FIG. 3
FIG. 4

WINDSHIELD WIPER BLADE MADE OF SYNTHETIC MATERIAL, WITH THE SUPPORTING STRUCTURE FORMED AS AN INTEGRAL ELEMENT

BACKGROUND OF THE INVENTION

The present invention relates to a windshield wiper blade made of a synthetic material, in particular a thermoplastic material, modable by casting or injection molding, having the supporting structure formed as an integral element such that it can be manufactured using very simple and little expensive molding and assembly methods; furthermore, said supporting structure is provided with inner reliefs which enable the windshield wiper blade to be deformed in order to exert, during the use, substantially uniform pressures on the glass on which it rests.

Windshield wiper blades are known in which the supporting structure, which is hooked to the arm of the windshield wiper device, has also the function of supporting the rubber element arranged to slide on the glass. Such windshield wiper blades are made entirely of thermoplastic material.

Thus, the supporting structure of such windshield wiper blades is formed as an integral element which is hooked onto the arm of the windshield wiper device and whose outer profile has the shape of a leaf spring, that is to say that its cross section is larger in the central portion and decreases progressively towards the ends; the purpose of this shape is to allow a flexure of the windshield wiper blade in the center line plane so that it may abut uniformly against the glass.

The lower portion of said supporting structure, where it has to retain the rubber element, comprises a plurality of small teeth located along both sides of the windshield wiper blade, which are alternate and bent so that the rubber element may be accomodated between said small teeth and the supporting structure and retained therebetween, whereas the cleaning portion of said rubber element protrudes beyond the surfaces of said small teeth.

However, the windshield wiper blades of the described type have some disadvantages.

First of all, said supporting structure which has a cross section decreasing gradually towards the ends, under the action of forces exerted on these ends, with components perpendicular to the center line plane of the windshield wiper blade, generated for instance by snow deposited on the glass, is subject to being bent laterally and in case of strong forces it can even break.

Moreover, the side surfaces of such supporting structure presents a plurality of spaces alternate with said small teeth, which spaces are subject to infiltration of earth, dust and other foreign bodies.

Furthermore, the supporting structure of the windshield wiper blades of the aforementioned type has, in its lower portion where the small teeth are located, a complex configuration and the molding of such supporting structure requires the use of complex molds which necessitate particular care for their operation. Therefore, such windshield wiper blades turn out to be rather costly, on the whole.

Finally, the windshield wiper blades made of thermoplastic material have the disadvantage that when they are subject to deformation at rather high temperature values they deform permanently, so that after the cessation of the force which causes them to bend in their plane of symmetry they do not resume their original shape.

SUMMARY OF THE INVENTION

The object of the present invention is to provide a windshield wiper blade of synthetic material, which allows to eliminate the above mentioned disadvantages.

According to the present invention there is provided a windshield wiper blade comprising a supporting structure having fixed on it a rubber element provided with an active edge which is apt to slide on the glass, said supporting structure being hinged to an attachment element which is apt to be fastened to a driving arm of the windshield wiper device, wherein said supporting structure has a substantially constant cross section, and in the lower portion of said supporting structure a plurality of inner recesses or reliefs being provided which allow said supporting structure to be deformed substantially in directions contained within the center line plane passing through said windshield wiper blade and said active edge of the rubber element.

BRIEF DESCRIPTION OF THE DRAWINGS

For a better understanding of the present invention some embodiments will be described hereinafter with reference to the accompanying drawings, wherein:

FIG. 1 is a side elevational view of the windshield wiper blade forming the object of the present invention;

FIG. 2 is a side elevational sectional view showing a portion of the supporting structure of the windshield wiper blade represented in FIG. 1 and the relative attachment element which is apt to connect the windshield wiper blade with the arm of the windshield wiper device;

FIG. 3 is a sectional view of the windshield wiper blade along the line III—III of FIG. 1;

FIG. 4 is a bottom view of the end portion of the supporting structure of the windshield wiper blade shown in FIG. 1;

DETAILED DESCRIPTION OF THE INVENTION

Figure 5:
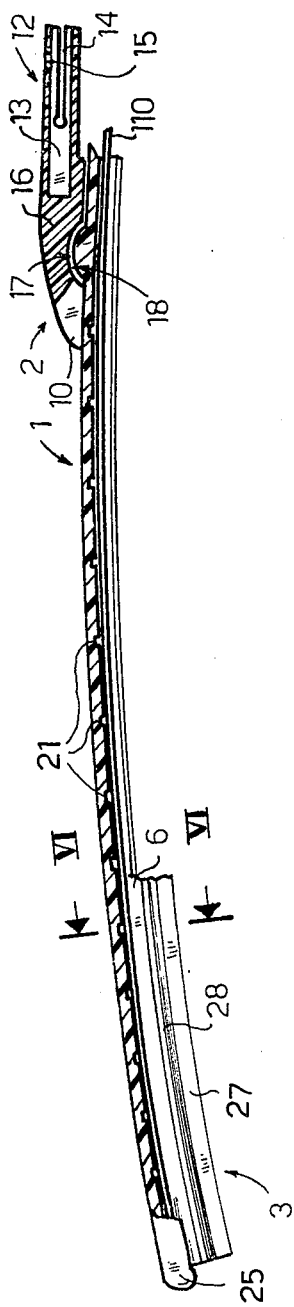
FIG. 5 is a side elevational partially sectional view of a portion of a windshield wiper blade according to a second embodiment of the present invention.

Referring now to FIG. 1, the windshield wiper blade according to the invention comprises substantially a supporting structure (shown in sectional views in FIGS. 2 and 3) indicated generally by reference numeral 1, having hinged on it an attachment element 2a rubber element 3 being in turn connected to said supporting structure 1.

The supporting structure 1, which has the function of a spring, is arc-shaped, with a constant cross section (visible in FIG. 3), and defines a continuous T-shaped channel 4 arranged to accomodate a corresponding T-shaped continuous projection 5 of the rubber element 3. Said channel 4 is generated by a couple of continuous legs 6, each having a substantially L-shaped cross section.

In the embodiment shown, on each of the side faces of the supporting structure 1, in correspondence with the central portion thereof, are formed recesses 7, from each one of which protrudes a corresponding pin 8 arranged to be inserted into a corresponding hole 9 formed in a wall 10 of the attachment element 2.

As shown in FIGS. 1 and 2, the side walls of the attachment element are obtained integrally in a small block 12 provided with a hole 13 having a rectangular cross section, arranged to be telescoped on the end portion of the arm of the windshield wiper device (not represented). Two opposite side walls of the small block are provided with slots 14 which have the function of rendering resiliently deformable the other walls of the small block, whereas one of said other walls is provided with a hole 15 which is apt to receive a corresponding protuberance (not represented) formed on said end portion of the arm of the windshield wiper device.

Protruding from the small block 12 is a wall 16 provided with a substantially cylindrical concave surface 17 which is apt to cooperate with a corresponding cylindrical convex surface 18 formed on a projecting portion of the supporting structure 1.

In correspondence with predetermined sections or regions said supporting strucure is formed with inner reliefs or recesses 21; as it can be seen in FIG. 3, said reliefs are obtained by removing some material from the supporting structure 1 above the channel 4. Said reliefs have a height which can conveniently be decreasing progressively from the center towards more distant regions of the windshield wiper blade and are located progressively closer to one another in direction towards the ends of the windshield wiper blade.

At each end of the supporting structure 1, the continuous legs 6 are deprived of their lower tab 23 so as to define, in such regions, channel sections 24 which have not a T-shaped cross section, but a substantially rectangular cross section in order to allow inserting the projection 5 of the rubber element 3 into the channel 4, as will be described hereinafter. Furthermore, two protruding portions 25 are provided to close the channel at its ends.

The rubber element 3 presents, as usual, a continuous rim 27 arranged to slide on the glass, and a couple of tabs 28 which are perpendicular to said rim.

Figure 6:
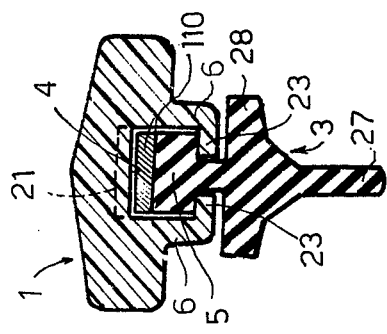
FIG. 6 is a side elevational view of the windshield wiper blade shown in FIG. 5, sectioned along the line VI—VI.

FIGS. 5 and 6 show a second embodiment of the windshield wiper blade of the invention, which, besides the elements of the described windshield wiper blade shown in FIGS. 1 and 2, indicated with the same reference numerals, comprises a metal element 110 having the shape of a lamination. Said element 110, which has a lenght substantially equal to the lenght of the channel 4, is arranged between the projection 5 of the rubber element 3 and the upper wall of the channel 4.

The metal element 110, which has proprieties of resilient deformability, accomplishes therefore the function of maintaining substantially indeformed the supporting structure 1 of the windshield wiper blade when the force applied onto the windshield wiper blade ceases, so that the latter, keeping always its original camber, is always in a position to accomplish its spring function.

Furthermore, said metal element 110 can serve to modify suitably the camber of the supporting structure 1 after the latter has been obtained by molding.

The assembly and the operation of the windshield wiper blade described in the foregoing are accomplished as follows.

The rubber element 3 is mounted on the supporting structure 1 by inserting an end of the projection 5 of the rubber element through a channel section 24 whose width, as said before, is substantially equal to that of the projection. After having inserted said end, the rubber element 3 is slided, relative to the supporting structure 1, in the interior of channel 4 so as to insert the projection completely into the interior of the channel, thereby causing the ends of said projection to come into contact with the protruding portions 25 which are apt to act as a stop for the rubber element 3.

After this operation has been achieved, the legs 6 and the protruding portions 25 of the supporting structure 1 constitute undercuts for the projection 5, thus preventing the rubber element from being casually detached from the supporting structure.

Successively, the attachment element 2 may be mounted onto the supporting structure 1. The pins 8, by deforming resiliently the walls 10, are positioned to correspond with the holes 9, thereby snapping into them.

When the windshield wiper blade described is mounted on an arm of a windshield wiper device, the end of the arm is inserted into the hole 13 of the small block 12; during this operation, the pin located on said end portion deforms resiliently the upper and lower walls of the small block until said pin is positioned in correspondence with the hole 15, thereby snapping resiliently into it.

In the embodiment represented in FIG. 5, instead, the supporting structure 1 presents at one end the protruding portion 25 serving to close the channel 4, whereas at the other end said channel may be open to allow introducing into it the metal element 110, or it may also be closed and such metal element 110 may be inserted, together with the projection 5 of the rubber element 3, into the channel 4 through a substantially rectangular aperture, formed at said end of the channel 4 because of the absence, in said region, of the bent portions of the legs 6.

In use, when the windshield wiper arm applies onto the central portion of the supporting structure 1 a force directed substantially in a direction perpendicular to the surface of the glass (or to the plane tangent to said surface), such force causes the supporting structure to flect so that the continuous rim 27 of the rubber element 3 comes entirely into contact with the surface of the glass.

The inner reliefs 21 located above the channel 4 in the supporting structure 1 have the function of allowing the flexibility of the supporting structure in the plane which contains the windshield wiper blade, under the action of said force.

At the same time, since the cross section of said supporting structure is substantially constant, the ends of the supporting structure can withstand very well the forces which tend to flect them laterally.

The supporting structure 1 and the attachment element 2 can be conveniently made of a synthetic material, for instance a thermoplastic material, using the usual technics of injection molding, because of the simple shape of these parts, the required molds turn out to be constructionally simple and considerable strong.

In particular, as regards the forming of the supporting structure 1, the mold for said structure, in order to simplify the constructional arrangement, can be constructed with a forming punch for the continuous channel 4, which punch, during the opening of the mold and the removal of the supporting structure from the mold, will move in a direction substantially perpendicular to the axis of the supporting structure. Under these circumstances, during said movement the tabs 23 of the legs 6 are resiliently deformed to allow the removal of said punch from the channel 4. Successively, the tabs 23 return to the original molding position (represented in FIG. 3).

Thus, the windshield wiper blade according to the present invention presents, with respect to the prior art windshield wiper blades, the advantage of withstanding considerably higher lateral loads, since its supporting structure 1 has a substantially constant cross section. In fact, the deformation of the supporting structure, in the central line plane containing it, in order to generate substantially constant pressures between the active edge 27 of the rubber element 3 and the glass, instead of being obtained by reducing gradually towards the ends the cross section of the supporting structure, is obtained by the provision of a plurality of inner reliefs having a suitable height and conveniently located progressively closer to one another towards the ends of the supporting structure.

Furthermore, the lower portion of the supporting structure 1, which locks the rubber element 3, is now substituted by continuous legs 6, so that the small teeth of the prior art windshield wiper blades are dispensed with; in this way, infiltration of foreign matters and dirt into the windshield wiper blade is prevented.

Finally, due to a major simplicity of the shape, the respective molds turn out to be less costly.

The windshield wiper blade according to the present invention has a good behavior also at high speeds of the vehicle. In fact, the aerodynamic actions applied on the windshield wiper blade when the vehicle is running, do not tend to disjoin said windshield wiper blade from the glass. The aforementioned aerodynamic actions are known to tend to detach the windshield wiper blade when the drag in the section of the plane which contains the windshield wiper blade is high, which occurs with the known windshield wiper blades of the prior art. In the windshield wiper blade according to the present invention, which is defined substantially by flat side surfaces deprived of the aforementioned teeth and spaces, the drag in said direction is very small.

The metal element 110 may also have a shape different from that of a rectangular cross section represented in FIGS. 5 and 6; for instance, it can have the shape of a rod. Furthermore, said metal element can be accomodated in a position different from the one which has been described; it can, for instance, be connected with the supporting structure 1 by insertion in small rings which protrude from the surface, also the outer one, of the windshield wiper blade. Moreover, the metal element 110 can also be inserted directly, during the molding process, into the material of the supporting structure of the windshield wiper blade.

It is obvious that various modifications and variations of the described embodiments of the present invention can be made without departing from the scope and the spirit of the invention.

What we claim is:

1. Windshield wiper blade, comprising a supporting structure having fixed on it a rubber element provided with an active edge which is apt to slide on the glass, said supporting structure being hinged to an attachment element which is apt to be fixed to a driving arm of the windshield wiper device, said supporting structure having a substantially constant cross section, and in the lower portion of said supporting structure being formed a continuous channel having a T-shaped cross section, in the interior of which channel being accomodated a corresponding projection of said rubber element, also having a T-shaped cross section, and in the upper wall of said continuous channel being formed a plurality of inner recesses or reliefs, said recesses presenting a height decreasing progressively as they approach the ends of said supporting structure, and the distance between two adjacent recesses being also decreasing progressively as they approach said ends, said recesses allowing the supporting structure to be deformed substantially in directions contained within the center line plane passing through said windshield wiper blade and said active edge of the rubber element, 2. The windshield wiper blade of claim 1, wherein said supporting structure is made of a thermoplastic material.

3. The windshield wiper blade of claim 1 wherein said channel of the supporting structure comprises, in correspondence with each end of said supporting structure, a short channel section which has a substantially rectangular cross section and is apt to allow the insertion of said projection of the rubber element into said T-shaped channel.

4. The windshield wiper blade of claim 1, wherein along the longitudinal axis of that portion of said supporting structure which supports said rubber element, there is arranged a metal element which is resiliently deformable, so that said portion of said supporting structure, in its rest position, and even at high temperature values, is caused to assume always substantially the same configuration.

5. The windshield wiper blade of claim 4, wherein said metal element has the shape of a lamination having a rectangular cross section.

6. The windshield wiper blade of claim 4, wherein said metal element has the shape of a rod.

7. The windshield wiper blade of claim 4, wherein said metal element is disposed between said T-shaped projection and the upper wall of said continuous channel.

8. The windshield wiper blade of claim 4, wherein the length of said metal element is substantially equal to the length of said continuous channel.

* * * * *